(12) United States Patent
Han (10) Patent No.: US 8,441,467 B2
(45) Date of Patent: *May 14, 2013

(54) MULTI-TOUCH SENSING DISPLAY THROUGH FRUSTRATED TOTAL INTERNAL REFLECTION

(75) Inventor: Jefferson Y. Han, Holliswood, NY (US)

(73) Assignee: Perceptive Pixel Inc., New York, NY (US)

(*) Notice: Subject to any disclaimer, the term of this patent is extended or adjusted under 35 U.S.C. 154(b) by 1111 days.

This patent is subject to a terminal disclaimer.

(21) Appl. No.: 11/833,908

(22) Filed: Aug. 3, 2007

(65) Prior Publication Data

US 2008/0029691 A1 Feb. 7, 2008
US 2008/0179507 A2 Jul. 31, 2008

Related U.S. Application Data

(60) Provisional application No. 60/821,325, filed on Aug. 3, 2006.

(51) Int. Cl.
G06F 3/042 (2006.01)
(52) U.S. Cl.
USPC ........... 345/176; 345/175; 345/173; 250/221; 250/224; 250/227; 178/18.09
(58) Field of Classification Search ................... 345/173, 345/175, 179, 176; 178/18.01, 18.09; 463/37; 250/221, 224, 227; 385/129, 131, 901
See application file for complete search history.

(56) References Cited

U.S. PATENT DOCUMENTS 3,200,701 A 8/1965 White
3,673,327 A 6/1972 Johnson et al.
(Continued)

FOREIGN PATENT DOCUMENTS

DE 10047920 A1 4/2002
JP 62-107325 5/1987
(Continued)

OTHER PUBLICATIONS

Lee, S., Buxton, W., and Smith, K. C., "A Multi-Touch Three Dimensional Touch-Sensitive Tablet," Proceedings of the SIGCHI Conference on Human Factors in Computing Systems (San Francisco, California, United States), CHI '85. ACM Press, New York, NY, 21-25 (1985).

(Continued)

Primary Examiner — Lun-Yi Lao
Assistant Examiner — Kelly B Hegarty
(74) Attorney, Agent, or Firm — Alleman Hall McCoy Russell & Tuttle LLP (57) ABSTRACT

High-resolution, scalable multi-touch sensing display systems and processes based on frustrated total internal reflection employ an optical waveguide that receives light, such as infrared light, that undergoes total internal reflection and an imaging sensor that detects light that escapes the optical waveguide caused by frustration of the total internal reflection due to contact by a user. The optical waveguide may be fitted with a compliant surface overlay to greatly improve sensing performance, minimize the affect of contaminants on and damage to the contact surface, to generally extend system life and to provide other benefits. The systems and processes provide true multi-touch (multi-input) and high-spatial and temporal resolution capability due to the continuous imaging of the frustrated total internal reflection that escapes the entire optical waveguide. Among other features and benefits, the systems and processes are scalable to large installations and are well suited for use with rear-projection and other display devices.

42 Claims, 6 Drawing Sheets

U.S. PATENT DOCUMENTS

| | | | |
|---|---|---|---|
| 3,846,826 A | | 11/1974 | Mueller |
| 4,134,063 A | | 1/1979 | Nicol et al. |
| 4,346,376 A | | 8/1982 | Mallos |
| 4,484,179 A | * | 11/1984 | Kasday .................. 345/176 |
| 4,668,861 A | * | 5/1987 | White .................. 250/227.21 |
| 4,816,811 A | * | 3/1989 | Bogatin et al. .................. 345/173 |
| 4,868,551 A | * | 9/1989 | Arditty et al. .................. 345/176 |
| 4,958,148 A | * | 9/1990 | Olson .................. 345/174 |
| 5,162,783 A | * | 11/1992 | Moreno .................. 345/175 |
| 5,246,782 A | * | 9/1993 | Kennedy et al. .................. 428/421 |
| 5,942,761 A | | 8/1999 | Tuli |
| 5,973,844 A | | 10/1999 | Burger |
| 6,061,177 A | | 5/2000 | Fujimoto |
| 6,323,846 B1 | * | 11/2001 | Westerman et al. .......... 345/173 |
| 6,323,892 B1 | | 11/2001 | Mihara |
| 6,570,557 B1 | * | 5/2003 | Westerman et al. .......... 345/173 |
| 6,677,934 B1 | * | 1/2004 | Blanchard .................. 345/175 |
| 6,700,129 B1 | | 3/2004 | Usuda et al. |
| 6,883,919 B2 | | 4/2005 | Travis |
| 6,895,164 B2 | | 5/2005 | Saccomanno |
| 6,972,753 B1 | * | 12/2005 | Kimura et al. .................. 345/175 |
| 6,997,558 B2 | | 2/2006 | Perlin et al. |
| 7,030,861 B1 | * | 4/2006 | Westerman et al. .......... 345/173 |
| 7,072,533 B1 | * | 7/2006 | Krier .................. 385/13 |
| 7,176,899 B2 | * | 2/2007 | Nagasaka et al. .................. 345/173 |
| 7,302,152 B2 | | 11/2007 | Luther et al. |
| 7,330,629 B2 | | 2/2008 | Cooke et al. |
| 7,351,949 B2 | | 4/2008 | Oon et al. |
| 7,394,058 B2 | | 7/2008 | Chua et al. |
| 7,410,286 B2 | | 8/2008 | Travis |
| 7,412,119 B2 | | 8/2008 | Smits |
| 7,417,627 B2 | | 8/2008 | Cok |
| 7,460,110 B2 | * | 12/2008 | Ung et al. .................. 345/173 |
| 7,859,519 B2 | * | 12/2010 | Tulbert .................. 345/173 |
| 8,125,468 B2 | * | 2/2012 | Han .................. 345/175 |
| 8,144,271 B2 | * | 3/2012 | Han .................. 349/12 |
| 8,259,240 B2 | * | 9/2012 | Han .................. 349/12 |
| 2002/0145593 A1 | | 10/2002 | Boyd et al. .................. 345/173 |
| 2003/0034439 A1 | * | 2/2003 | Reime et al. .................. 250/221 |
| 2003/0156080 A1 | * | 8/2003 | Koike et al. .................. 345/60 |
| 2003/0210537 A1 | | 11/2003 | Engelmann |
| 2004/0071417 A1 | | 4/2004 | Veligdan |
| 2004/0201579 A1 | * | 10/2004 | Graham .................. 345/175 |
| 2005/0012722 A1 | * | 1/2005 | Chon .................. 345/173 |
| 2005/0068537 A1 | | 3/2005 | Han et al. |
| 2005/0162381 A1 | * | 7/2005 | Bell et al. .................. 345/156 |
| 2005/0200293 A1 | * | 9/2005 | Naugler et al. .................. 315/149 |
| 2006/0022956 A1 | | 2/2006 | Lengeling et al. |
| 2006/0026521 A1 | | 2/2006 | Hotelling et al. |
| 2006/0026535 A1 | | 2/2006 | Hotelling et al. |
| 2006/0026536 A1 | | 2/2006 | Hotelling et al. |
| 2006/0033724 A1 | | 2/2006 | Chaudhri et al. |
| 2006/0053387 A1 | | 3/2006 | Ording |
| 2006/0066586 A1 | * | 3/2006 | Gally et al. .................. 345/173 |
| 2006/0085757 A1 | | 4/2006 | Andre et al. |
| 2006/0086896 A1 | | 4/2006 | Han |
| 2006/0098004 A1 | | 5/2006 | Cok |
| 2006/0125803 A1 | * | 6/2006 | Westerman et al. .......... 345/173 |
| 2006/0132453 A1 | * | 6/2006 | Boyd et al. .................. 345/173 |
| 2006/0138945 A1 | * | 6/2006 | Wolk et al. .................. 313/506 |
| 2006/0154092 A1 | * | 7/2006 | Naito et al. .................. 428/457 |
| 2006/0158437 A1 | | 7/2006 | Blythe et al. |
| 2006/0188196 A1 | | 8/2006 | Charters et al. |
| 2006/0227120 A1 | * | 10/2006 | Eikman .................. 345/175 |
| 2006/0279558 A1 | | 12/2006 | Van Delden et al. |
| 2007/0070050 A1 | | 3/2007 | Westerman et al. |
| 2007/0084989 A1 | | 4/2007 | Lange et al. |
| 2007/0152985 A1 | | 7/2007 | Ostergaard et al. |
| 2007/0229477 A1 | * | 10/2007 | Ludwig .................. 345/173 |
| 2008/0150913 A1 | * | 6/2008 | Bell et al. .................. 345/175 |
| 2008/0192025 A1 | | 8/2008 | Jaeger et al. |
| 2008/0284925 A1 | * | 11/2008 | Han .................. 349/12 |
| 2009/0033637 A1 | | 2/2009 | Han |
| 2009/0128499 A1 | | 5/2009 | Izadi et al. |
| 2010/0001962 A1 | * | 1/2010 | Doray et al. .................. 345/173 |
| 2010/0149134 A1 | * | 6/2010 | Westerman et al. .......... 345/179 |
| 2010/0302185 A1 | | 12/2010 | Han |
| 2010/0302196 A1 | | 12/2010 | Han |
| 2010/0302210 A1 | | 12/2010 | Han |
| 2012/0182266 A1 | * | 7/2012 | Han .................. 345/175 |

FOREIGN PATENT DOCUMENTS

| | | | |
|---|---|---|---|
| JP | 8-50526 | | 2/1996 |
| JP | 10-162698 | | 6/1998 |
| JP | 200494569 | | 3/2004 |
| JP | 2004094569 | * | 3/2004 |
| JP | 2006318512 | | 11/2006 |
| WO | 0172037 | | 9/2001 |
| WO | 02/45413 A1 | | 6/2002 |
| WO | 2005/029395 A2 | | 3/2005 |
| WO | 2005029172 | | 3/2005 |
| WO | 2006/044652 A1 | | 4/2006 |
| WO | 2006/082444 A2 | | 8/2006 |
| WO | 2007/003196 A2 | | 1/2007 |
| WO | 2007/008766 A1 | | 1/2007 |
| WO | 2008017077 | | 2/2008 |
| WO | 2009018317 | | 2/2009 |
| WO | 2009020940 | | 2/2009 |
| WO | 2010141372 | | 12/2010 |
| WO | 2010141380 | | 12/2010 |
| WO | 2010141453 | | 12/2010 |

OTHER PUBLICATIONS

Rekimoto, J., "SmartSkin: An Infrastructure for Freehand Manipulation on Interactive Surfaces," Proceedings of the SIGCHI Conference on Human Factors in Computing Systems, CHI '02, ACM Press, New York, NY, 113-120 (2002) (8 pgs).

Matsushita, N. and Rekimoto, J., "HoloWall: Designing a Finger, Hand, Body, and Object Sensitive Wall," Proceedings of the 10th Annual ACM Symposium on User Interface Software and Technology (Banff, Alberta, Canada, Oct. 14-17, 1997), UIST '97, ACM Press, New York, NY, 209-210 (1997).

Wilson, A. D., "TouchLight: An Imaging Touch Screen and Display for Gesture-Based Interaction," Proceedings of the 6th International Conference on Multimodal Interfaces (State College, PA, USA, Oct. 13-15, 2004), ICMI '04, ACM Press, New York, NY, (2004) (6 pgs).

Malik, S. and Laszlo, J., "Visual Touchpad: A Two-Handed Gestural Input Device," Proceedings of the 6th International Conference on Multimodal Interfaces (State College, PA, USA, Oct. 13-15, 2004), ICMI '04, ACM Press, New York, NY, 289-296 (2004) (8 pgs).

Buxton, W., Hill, R., and Rowley, P., "Issues and Techniques in Touch-Sensitive Tablet Input," Proceedings of the 12th Annual Conference on Computer Graphics and Interactive Techniques SIGGRAPH '85, ACM Press, New York, NY, 215-224 (1985).

Westerman, W., Elias, J. G., and Hedge, A., "Multi-Touch: A New Tactile 2-D Gesture Interface for Human-Computer Interaction," Proceedings of the Human Factors and Ergonomics Society 45th Annual Meeting (Minneapolis/St. Paul, MN, Oct. 2001), 632-636 (2001).

Han, Jefferson Y., "Low-Cost Multi-Touch Sensing through Frustrated Total Internal Reflection," Media Research Laboratory, (New York University; Oct. 23-27, 2005; Seattle Washington), 115-118.

Boual, Sophie; Large, Timothy; Buckingham, Mark; Travis, Adrian; Munford, Simon, "Wedge Displays as Cameras," 2006 Society for Information Display (SID) International Symposium Digest of technical Papers, pp. 1999-2002 (2006).

Non-final Office Action issued in U.S. Appl. No. 12/185,782, mailed Jan. 12, 2011, 14 pages.

International Search Report dated Oct. 20, 2008 from WO08/017077, 3 pages.

International Search Report dated Feb. 19, 2009 from WO09/020940, 2 pages.

International Search Report dated Jan. 29, 2009 from WO09/018317, 2 pages.

Notice of Allowance mailed Nov. 18, 2011 in U.S. Appl. No. 12/185,782, 12 pages.

Anonymous: "Anti-reflective coating", Wikipedia, Feb. 6, 2009, retrieved from the Internet: http://replay.waybackmachine.org/20090206235736//http://en.widipedia.org/wiki/Anti-reflective_coating (retrieved on Mar. 30, 2011), 6 pages.

Taira, Y., et al., "Low-Power LCD Using a Novel Optical System", 2002 SID International Symposium Digest of Technical Papers, Boston, MA, May 21-23, 2002, 3 pages.

International Search Report and Written Opinion dated Apr. 28, 2011 from WO10/141372, 25 pages.

International Search Report and Written Opinion dated Mar. 1, 2011 from WO10/141380, 18 pages.

International Search Report and Written Opinion dated Apr. 28, 2011 from WO10/141453, 18 pages.

European Search Report dated Oct. 7, 2011 from EP 08782614.5, 5 pages.

Communication Pursuant to Article 94(3) EPC, dated Oct. 27, 2011 in EP Application No. 08782614.5, 7 pages.

Notice of Allowance mailed Aug. 11, 2011 in U.S. Appl. No. 12/185,782, 12 pages.

USPTO Notice of Allowance in Serial No. 13,430,484 dated May 2, 2012, 22 pages.

\* cited by examiner

MULTI-TOUCH SENSING DISPLAY THROUGH FRUSTRATED TOTAL INTERNAL REFLECTION

REFERENCE TO RELATED APPLICATION

This application claims priority to U.S. patent application No. 60/821,325, filed Aug. 3, 2006, the disclosure of which is incorporated herein by reference.

BACKGROUND OF THE INVENTION

1. Field of the Invention

The present invention relates to techniques for enabling high-resolution multi-touch sensing displays based on frustrated total internal reflection.

2. Description of the Related Art

Touch sensing is commonplace for single points of contact, but it is relatively difficult to sense multiple points of contact simultaneously or "multi-touch sensing."

One fairly straightforward approach for multi-touch sensing is to utilize multiple discrete sensors, with each sensor sensing a respective point of contact. For example, Tactex Control Inc. has a line of array sensors for use as floor sensors, security devices and other applications. As another example, the publication Lee, S., Buxton, W., and Smith, K. C., "A Multi-Touch Three Dimensional Touch-Sensitive Tablet," Proceedings of the SIGCHI Conference on Human Factors in Computing Systems (San Francisco, Calif., United States), CHI '85. ACM Press, New York, N.Y., 21-25 (1985), incorporated herein by reference, describes the use of sensors arranged in a matrix configuration with an active element (diode) disposed at each node. The Fingerworks iGesturePad is another example of a device that employs multiple discrete sensors in a matrix configuration with active transistors at each node. U.S. Pat. No. 6,323,846 to Westerman et al., incorporated herein by reference, discloses additional examples of using an array of proximity sensors in a multi-touch surface system.

Multi-touch sensing may be achieved by carefully employing a purely passive matrix of force-sensitive-resistors (FSRs), as discussed in Hillis, W. D., "A High Resolution Imaging Touch Sensor," International Journal of Robotics Research, pages 1, 2, 33-44 (1982), incorporated herein by reference. U.S. Pat. No. 4,134,063 to Nicol et al., incorporated herein by reference, discloses the use of capacitive electrodes for this purpose. And more recently discussed in Rekimoto, J., "SmartSkin: An Infrastructure for Freehand Manipulation on Interactive Surfaces," Proceedings of the SIGCHI Conference on Human Factors in Computing Systems, CHI '02, ACM Press, New York, N.Y., 113-120 (2002), incorporated herein by reference. Such systems, while less complex than systems that employ multiple active sensors, still entail numerous electrical connections and thus disadvantageously limit their application to uses that require relatively low resolution (e.g., under 100×100). Furthermore, such systems are visually opaque and thus require the use of top-projection if to be integrated with a graphic display. Finally, such systems have had problems with robustness given the feeble nature of the electrical signals they utilize.

The use of video cameras has been proposed to acquire high-resolution datasets at rapid rates. However, these video based techniques are quite imprecise and are not able to determine if true touch contact has been made, a disparity that can be quite disturbing to the user. Recent approaches include estimating depth from intensity as discussed in Matsushita, N. and Rekimoto, J., "HoloWall: Designing a Finger, Hand, Body, and Object Sensitive Wall," Proceedings of the 10th Annual ACM Symposium on User Interface Software and Technology (Banff, Alberta, Canada, Oct. 14-17, 1997), UIST '97, ACM Press, New York, N.Y., 209-210 (1997); estimating depth from stereo as disclosed in Wilson, A. D., "TouchLight: An Imaging Touch Screen and Display for Gesture-Based Interaction," Proceedings of the 6th International Conference on Multimodal Interfaces (State College, Pa., USA, Oct. 13-15, 2004), ICMI '04, ACM Press, New York, N.Y., 69-76 (2004); Malik, S. and Laszlo, J., "Visual Touchpad: A Two-Handed Gestural Input Device," Proceedings of the 6th International Conference on Multimodal Interfaces (State College, Pa., USA, Oct. 13-15, 2004), ICMI '04, ACM Press, New York, N.Y., 289-296 (2004); and tracking markers embedded within a deformable substrate as disclosed in Kamiyama, K., Vlack, K., Mizota, T., Kajimoto, H., Kawakami, N., and Tachi, S., "Vision-Based Sensor for Real-Time Measuring of Surface Traction Fields," IEEE Comput. Graph. Appl. 25, 1 (January 2005), 68-75. Each of these references is incorporated herein by reference.

Another group of touch sensing techniques is to employ frustrated total internal reflection (FTIR). When light encounters an interface to a medium with a lower index of refraction (e.g. glass to air), the light becomes refracted to an extent which depends on its angle of incidence, and beyond a certain critical angle, it undergoes total internal reflection (TIR). Fiber optics, light pipes, and other optical waveguides rely on this phenomenon to transport light efficiently with very little loss. However, another material at the interface can frustrate this total internal reflection, causing light to escape the waveguide there instead.

Frustrated total internal reflection is well known and has been used in the biometrics community to image fingerprint ridges since at least the 1960s. U.S. Pat. No. 3,200,701 to White, incorporated herein by reference, issued in 1965 and describes using FTIR to optically detect the ridge pattern of a skin surface.

U.S. Pat. No. 3,673,327 to Johnson et al., incorporated herein by reference, issued in 1972 and discloses an early version of a touch actuable device in which a binary device detects the attenuation of light through a platen waveguide caused by a finger in contact.

U.S. Pat. No. 3,846,826 to Mueller, incorporated herein by reference, issued in 1974 and describes an imaging touch sensor that allows a user to "paint" onto a display using free-form objects, such as brushes, styli and fingers. In that device, light from the flying spot of a CRT is totally internally reflected off the face of a large prism and focused onto a single photo detector, thereby generating an updating bitmap of areas that are being contacted. In 1985, this method was updated in an optically inverted configuration, with a video camera and a broad light source replacing the CRT and photodetector, as disclosed in Greene, R., "The Drawing Prism: A Versatile Graphic Input Device," Proceedings of the 12th Annual Conference on Computer Graphics and Interactive Techniques SIGGRAPH '85, ACM Press, New York, N.Y., 103-110 (1985), incorporated herein by reference.

U.S. Pat. No. 4,346,376 to Mallos, incorporated herein by reference, discloses a CRT-based touch sensor, which replaced the bulky prism with a thin platen waveguide and operates by detecting the light scattered away by an object in optical contact. More recent fingerprint sensors use this approach, as disclosed in Fujieda, I., Haga, H., "Fingerprint Input based on Scattered-Light Detection," Applied Optics-IP, 36, 35, 9152-9156 (1997), incorporated herein by reference.

The robotics community also has used this approach since 1984 in the construction of tactile sensors for robot grippers, but with a compliant surface overlay. Various publications include: Mott, D. H., Lee, M. H., and Nicholls, H., "An Experimental Very High Resolution Tactile Sensor Array," Robot Sensors Vol. 2: Tactile and Non-Vision, Pugh, A., Ed. Springer-Verlag, Berlin, 179-188 (1986); Tanie, K., Komoriya, K., Kaneko, M., Tachis, S., and Fujikava, A., "A High Resolution Tactile Sensor," Robot Sensors Vol. 2: Tactile and Non-Vision, Pugh, A., Ed. Springer-Verlag, Berlin, 189-198 (1986); and U.S. Pat. No. 4,668,861 to White, each of which is incorporated herein by reference.

With the use of a compliant surface overlay, a structured flexible membrane, normally kept apart from the waveguide by an air-gap, makes optical contact with the waveguide when depressed. U.S. Pat. No. 4,484,179 to Kasday, incorporated herein by reference, discloses this approach in the context of a touch sensitive display.

Additional publications that set forth various interaction techniques utilizing multi-touch sensing include: Buxton, W., Hill, R., and Rowley, P., "Issues and Techniques in Touch-Sensitive Tablet Input," Proceedings of the 12th Annual Conference on Computer Graphics and Interactive Techniques SIGGRAPH '85, ACM Press, New York, N.Y., 215-224 (1985); Dietz, P. and Leigh, D., "DiamondTouch: A Multi-User Touch Technology," Proceedings of the 14th Annual ACM Symposium on User Interface Software and Technology (Orlando, Fla., Nov. 11-14, 2001), UIST '01. ACM Press, New York, N.Y., 219-226 (2001); Westerman, W., Elias, J. G., and Hedge, A., "Multi-Touch: A New Tactile 2-D Gesture Interface for Human-Computer Interaction," Proceedings of the Human Factors and Ergonomics Society 45th Annual Meeting (Minneapolis/St. Paul, Minn., October 2001), 632-636 (2001); and Wu, M. and Balakrishnan, R., "Multi-Finger and Whole Hand Gestural Interaction Techniques for Multi-User Tabletop Displays," Proceedings of the 16th Annual ACM Symposium on User Interface Software and Technology (Vancouver, Canada, Nov. 2-5, 2003), UIST '03, ACM Press, New York, N.Y., 193-202 (2003), each of which is incorporated herein by reference.

OBJECTS AND SUMMARY OF THE INVENTION

In view of the foregoing, it is seen that there has only limited development in the field of multi-touch sensing displays. Hence, there remains the need for a multi-touch sensing display that is high resolution and high precision, relatively simple, inexpensive and scalable.

It is therefore an object of the present invention to provide multi-touch sensing display systems/processes that are relatively simple, inexpensive and scalable for providing high-resolution multi-touch sensing.

It is a further object of the present invention to provide multi-touch sensing systems/processes that are based on frustrated total internal reflection.

It is another object of the present invention to provide multi-touch sensing systems/processes suitable for use with graphical display without resorting to top projection.

In accordance with one embodiment of the present invention, a multi-touch sensing display comprises an optical waveguide adapted (i.e., designed) to receive light and adapted to cause some of the received light to undergo total internal reflection within the optical waveguide, the optical waveguide adapted to allow total internal reflection to be frustrated upon occurrence of a physical phenomena and adapted to allow some of the received light to escape when total internal reflection is frustrated, and an imaging camera adapted to detect light escaping the optical waveguide.

As an aspect of the invention, the sensor includes infrared light emitting diodes disposed directly against the edge of the optical waveguide.

As a further aspect of the invention, the optical waveguide is a sheet of acrylic with edges treated to admit light.

As another aspect of the invention, the physical phenomena entails contacting the optical waveguide with an object so that total internal reflection is frustrated upon such contact.

As a feature of this aspect, the object is a finger of a user of the multi-touch sensing display.

As another aspect of the invention, the optical waveguide is adapted to allow total internal reflection to be frustrated simultaneously at multiple positions upon occurrence of multiple physical phenomenon, and some of those positions are disposed apart from one another.

As a feature of this aspect, the physical phenomenon include at least contacting a first location of a surface of the optical waveguide with a first object and contacting a second location of the surface of the optical waveguide with a second object, the first and second locations being disposed apart from one another, and the optical waveguide is adapted to cause total internal reflection to be frustrated at corresponding first and second positions.

As a further feature of this aspect, the first and second objects are first and second fingers of a user of the multi-touch sensing display.

As another aspect of the invention, an imaging sensor is adapted to discriminately detect light output from positions along a two-dimensional surface of the optical waveguide.

As an additional aspect of the invention, the imaging camera is adapted to discriminately detect light simultaneously escaping from multiple positions along a two-dimensional surface of the optical waveguide.

As yet a further aspect of the invention, the sensor includes a light source adapted to emit light of a predetermined wavelength that is received by the optical waveguide, and the imaging camera is adapted to detect light only substantially at the predetermined wavelength.

As yet another aspect of the invention, the sensor includes a light source adapted to emit light of first and second predetermined wavelengths that are received by the optical waveguide, and the imaging camera is adapted to detect light only substantially at the first predetermined wavelength, and the multi-touch sensing display further includes a second imaging camera adapted to detect light only substantially at the second predetermined wavelength escaping the optical waveguide.

As yet an additional aspect of the invention, the sensor includes a light source adapted to emit pulses of light at a rate substantially synchronized to the shutter of the imaging camera.

As another aspect of the invention, the optical waveguide has a non-planar surface, and the physical phenomena comprises contacting the non-planar surface of the optical waveguide so that total internal reflection is frustrated upon such contact.

As a further aspect of the invention, the sensor includes a video projector adapted to project a two-dimensional video image onto the optical waveguide.

As a feature of this aspect, the multi-touch sensing display includes a diffuser onto which the video image is projected.

As another feature of this aspect, the optical waveguide includes non-contact and contact surfaces, the diffuser is disposed on the non-contact surface and the physical phenomena comprises contacting the contact surface of the optical waveguide so that total internal reflection is frustrated upon such contact.

As a further feature of this aspect, the video projector is disposed on a non-contact side of the optical waveguide corresponding to a side on which the non-contact surface is disposed, and the video projector is adapted to project the video image toward the optical waveguide for viewing by a user disposed on a contact side of the optical waveguide.

As another aspect of the invention, the sensor includes a video projector adapted to project a two-dimensional video image and a diffuser disposed adjacent to a surface of the optical waveguide, and the video image is projected onto the diffuser.

As a feature of this aspect, a small gap is disposed between a substantial portion of the diffuser and the optical waveguide so that frustration by the diffuser is minimized.

As a further feature of this aspect, the diffuser is an electro-switchable diffuser screen synchronized to a rate of projection of the video projector, and is made non-diffusive according to the shutter periods of the imaging sensor.

As a further feature of this aspect, the diffuser is a directional diffuser (e.g. holographic, Lumisty, etc.) that diffuses for certain angles of incidence, and is non-diffuse for others.

As a further aspect of the invention, additional cameras are used to view through the diffuser when it is made non-diffusive to observe the touching object.

As another aspect of the invention, the imaging camera includes multiple imaging cameras adapted to detect light escaping from respectively different portions of the optical waveguide.

As a feature of this aspect, the sensor includes multiple video projectors and each video projector is adapted to project a respective two-dimensional video image onto a respective one of the different portions of the optical waveguide.

As an additional aspect of the invention, the sensor includes an LCD display panel disposed between the imaging camera and the optical waveguide, and the LCD display panel is transparent to light escaping the optical waveguide so as to not prevent the escaping light from being detected by the imaging camera.

In accordance with another embodiment of the present invention, a multi-touch sensing display comprises an optical waveguide adapted to receive light and adapted to cause some of the received light to undergo total internal reflection within the optical waveguide, a compliant surface overlay disposed sufficiently close to the optical waveguide to enable depression of the compliant surface overlay by an external force to cause the compliant surface overlay to contact the optical waveguide, the optical waveguide and the compliant surface overlay adapted to cause total internal reflection within the optical waveguide to be frustrated upon contact of the optical waveguide by the compliant surface overlay, the optical waveguide adapted to allow some of the light undergoing total internal reflection to escape when total internal reflection is frustrated, and an imaging camera adapted to detect light escaping the optical waveguide.

As an aspect of this embodiment of the present invention, a small gap is disposed between a substantial portion of the compliant surface overlay and the optical waveguide so that frustration of total internal reflection is minimized during non-depression of the compliant surface overlay.

As a further aspect of this embodiment, the compliant surface overlay is adapted to be depressed by a finger of a user of the multi-touch sensing display.

As a further aspect of this embodiment, the compliant surface overlay is adapted to be depressed by passive styluses, gloved hands, and arbitrary objects.

As another aspect of this embodiment, the compliant surface overlay is adapted to contact the optical waveguide at multiple locations simultaneously in response to simultaneous depression of the compliant surface overlay at multiple corresponding locations, while maintaining a gap in locations that are not depressed, and the optical waveguide is adapted to cause total internal reflection to be frustrated simultaneously within the optical waveguide at those locations.

As a feature of this aspect, at least two of the depressed locations are disposed apart from one another.

As an additional aspect, the imaging camera is adapted to discriminately detect light output from positions along a two-dimensional surface of the optical waveguide.

As yet a further aspect, the imaging camera is adapted to discriminately detect light simultaneously escaping from multiple positions along a two-dimensional surface of the optical waveguide.

As yet another aspect, the sensor further includes a light source adapted to emit light of a predetermined wavelength that is received by the optical waveguide, and the imaging camera is adapted to detect light only substantially at the predetermined wavelength.

As an additional aspect, the light source emits light of first and second predetermined wavelengths, and the imaging camera is adapted to detect light only substantially at the first predetermined wavelength, and the multi-touch sensing display further includes a second imaging camera adapted to detect light only substantially at the second predetermined wavelength escaping the optical waveguide.

As yet a further aspect, the light source emits pulses of light at a rate substantially synchronized to the shutter of the imaging sensor.

As yet another aspect, the compliant surface overlay includes a non-planar contact surface.

As a further aspect, the sensor includes a video projector adapted to project a two-dimensional video image onto the optical waveguide.

As a feature of this aspect, the multi-touch sensing display includes a diffuser onto which the video image is projected.

As a feature of this feature, the diffuser is an electro-switchable diffuser screen synchronized to a rate of projection of the video projector, and is made non-diffusive according to the shutter periods of the imaging sensor.

As a further feature, the diffuser is a directional diffuser (e.g. holographic, Lumisty, etc.) that diffuses for certain angles of incidence, and is non-diffuse for others.

As yet another feature, additional cameras are used to view through the diffuser when it is made non-diffusive to observe the touching object.

As another feature of this aspect, the compliant surface overlay is adapted to diffuse the video image projected by the video projector.

As yet a further aspect of this embodiment, the compliant surface overlay includes a component that rejects ambient light of the same wavelengths as the light source, a component that reduces friction at the interaction surface, a component that reduces glare, and a component that provides a comfortable cushion for the user to depress.

As yet another aspect, the sensor includes a video projector adapted to project a two-dimensional video image through the optical waveguide onto the compliant surface overlay, and the compliant surface overlay has a thin layer of rubber adapted to diffuse the video image projected by the video projector.

In accordance with a further embodiment of the present invention, a method of multi-touch sensing comprises the steps of receiving light within an optical waveguide, internally reflecting the received light within the optical waveguide, frustrating the internally reflected light within the optical waveguide to cause some of the reflected light to escape the optical waveguide, and imaging the escaped light.

As an aspect of this embodiment of the present invention, the light is emitted by a light source having multiple infrared light emitting diodes.

As a further aspect, the method includes providing a sheet of acrylic with edges treated to admit light as the optical waveguide.

As an additional aspect, the optical waveguide is contacted with an object to frustrate the internally reflected light.

As yet another aspect, one or more fingers of a user contact the optical waveguide to frustrate the internally reflected light.

As yet a further aspect, the internally reflected light is frustrated simultaneously at multiple positions within the optical waveguide, and some of those positions are disposed apart from one another.

As yet an additional aspect, first and second locations of the optical waveguide disposed apart from one another are simultaneously contacted to cause reflected light to escape simultaneously from corresponding positions of the optical waveguide.

As a feature of this aspect, frustration at such multiple positions is carried out by contacting the optical waveguide by two fingers of a user.

As yet a further aspect, the light escaping the optical waveguide is imaged discriminately along a two-dimensional surface.

As yet another aspect, discriminate imaging of light simultaneously escaping from multiple positions along a two-dimensional surface of the optical waveguide is carried out.

As yet an additional aspect, light of a predetermined wavelength is received within the optical waveguide, and light only substantially at the predetermined wavelength escaping the optical waveguide is imaged.

As yet a further aspect, light of two different wavelengths is received within the optical waveguide, and light only substantially at those wavelengths escaping the optical waveguide is imaged.

As a feature of this aspect, two different cameras image light at the two different wavelengths.

As yet a further aspect, pulses of light are received within the optical waveguide, and an imaging camera having a shutter synchronized to the rate of the pulses detects the escaped light.

As yet another aspect, an optical waveguide having a non-planar surface is provided.

As yet an additional aspect, the method includes projecting a two-dimensional video image onto the optical waveguide.

As a feature of this aspect, a diffuser is provided to diffuse the projected video image.

As yet a further aspect, a two-dimensional video image is projected on and diffused by a diffuser disposed on a non-contact surface of the optical waveguide, and a contact surface of the optical waveguide is contacted to cause the internally reflected light to be frustrated.

As a feature of this aspect, the video image is projected from a non-contact side of the optical waveguide.

As yet another aspect, the projected video image is diffused adjacent to the optical waveguide.

As a feature of this aspect, a small gap between a substantial portion of the diffuser and the optical waveguide is provided so that frustration of the internally reflected light by the diffuser is minimized.

As a further feature of this aspect, an electro-switchable diffuser screen synchronized to a rate of projection of the video image is provided, the electro-switchable diffuser screen being non-diffusive according to the shutter periods of a sensor imaging the escaped light.

As yet another feature, the provided electro-switchable diffuser screen is a directional (e.g. holographic, Lumisty, etc.) that diffuses for certain angles of incidence, and is non-diffuse for others As another aspect, additional cameras are provided to view through the diffuser when the diffuser is made non-diffusive to observe the touching object.

As yet a further aspect, multiple imaging cameras image light escaping from respectively different portions of the optical waveguide.

As a feature of this aspect, multiple video images are projected onto the respectively different portions of the optical waveguide.

As yet another aspect, a video image is displayed through the optical waveguide by an LCD display panel that allows light escaping the optical waveguide to pass through it.

In accordance with another embodiment of the present invention, a method of multi-touch sensing comprises the steps of receiving light within an optical waveguide, internally reflecting the received light within the optical waveguide, depressing a compliant surface overlay disposed adjacent to the optical waveguide, contacting the optical waveguide by the compliant surface overlay upon depressing the compliant surface overlay, frustrating the internally reflected light within the optical waveguide upon contacting the optical waveguide by the compliant surface overlay to cause some of the internally reflected light to escape the optical waveguide, and imaging the escaped light.

As an aspect of this embodiment of the present invention, the method further includes the steps of disposing a small gap between a substantial portion of the compliant surface overlay and the optical waveguide so that frustrating the internally reflected light is minimized when the compliant surface overlay is not depressed.

As a further aspect of this embodiment, the compliant surface overlay is depressed by a finger of a user.

As yet a further aspect, the compliant surface overlay is depressed by passive styluses, gloved hands, and/or arbitrary objects.

As another aspect, the compliant surface overlay is depressed simultaneously at multiple locations, the optical waveguide is contacted simultaneously by the compliant surface overlay at multiple corresponding locations, and the internally reflected light within the optical waveguide is frustrated simultaneously at those corresponding locations.

As a feature of this aspect, at least two of the corresponding locations are disposed apart from one another.

As an additional aspect, light output from positions along a two-dimensional surface of the optical waveguide is imaged discriminately.

As yet a further aspect, light simultaneously escaping from multiple positions along a two-dimensional surface of the optical waveguide is imaged discriminately.

As yet another aspect, light of a predetermined wavelength is received within the optical waveguide, and light escaping the optical waveguide at the predetermined wavelength is imaged.

As yet an additional aspect, light of two different predetermined wavelengths is received within the optical waveguide, and light substantially only at those wavelengths escaping the optical waveguide is imaged.

As a feature of this aspect, first and second cameras are provided and each camera images light at a different wavelength.

As yet a further aspect, pulses of light are received within the optical waveguide, and an imaging camera having a shutter substantially synchronized to that images the escaped light.

As yet another aspect, a compliant surface overlay having a non-planar contact surface is provided.

As yet an additional aspect, a two-dimensional video image is projected onto a diffuser disposed on the optical waveguide.

As a further object, an electro-switchable diffuser screen synchronized to a rate of projection of the video image is provided, the electro-switchable diffuser screen being non-diffusive according to the shutter periods of a sensor imaging the escaped light.

As yet another feature, the provided electro-switchable diffuser screen is a directional (e.g. holographic, Lumisty, etc.) that diffuses for certain angles of incidence, and is non-diffuse for others As another aspect, additional cameras are provided to view through the diffuser when the diffuser is made non-diffusive to observe the touching object.

As a feature of this aspect, the projected video image is diffused by a diffuser disposed on the optical waveguide.

As a further feature of this aspect, the compliant surface overlay diffuses the projected video image.

As yet another aspect, the compliant surface overlay includes a component that rejects ambient light of the same wavelengths as the light source, a component that reduces friction at the interaction surface, a component that reduces glare, and a component that provides a comfortable cushion for the user to depress.

As yet an additional aspect, a video image is projected through the optical waveguide onto the compliant surface overlay, and the projected video image is diffused by the compliant surface overlay.

Various other objects, advantages and features of the present invention will become readily apparent to those of ordinary skill in the art, and the novel features will be particularly pointed out in the appended claims.

BRIEF DESCRIPTION OF THE DRAWINGS

The following detailed description, given by way of example and not intended to limit the present invention solely thereto, will best be appreciated in conjunction with the accompanying drawings, wherein like reference numerals denote like elements and parts, in which.

DETAILED DESCRIPTION OF THE PRESENT INVENTION

Multi-touch sensing enables a user to interact with a system with more than one finger at a time, as in chording and bi-manual operations. Multi-touch sensing may accommodate multiple users simultaneously, which is especially useful for larger shared-display systems such as interactive walls and tabletops. FIGS. 1A through 1D of the drawings show several simple examples of multi-touch sensing of the present invention.

Multi-touch sensing in accordance with the present invention is based on frustrated total internal reflection (FTIR). When light encounters an interface to a medium with a lower index of refraction, such as glass to air, the light becomes refracted to an extent which depends on its angle of incidence. Beyond a certain critical angle, the light undergoes total internal reflection (TIR). But, if another material is placed at the interface, total internal reflection is frustrated, causing light to escape the waveguide. Since the concept of FTIR is well known and understood in the art, further technical description of FTIR is omitted herein except where necessary for an understanding of the present invention.

The present invention employs FTIR to produce a system that acquires true touch image information at high spatial and temporal resolutions. As discussed herein, by such use, the multi-touch system of the present invention is scalable to large installations, and is well suited for use with display technologies including rear-projection.

Figure 1A:
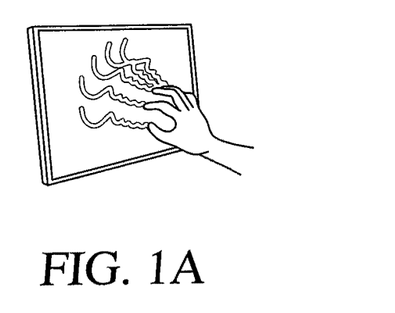
FIGS. 1A-1D show several examples of multi-touch sensing in accordance with the present invention.
Figure 1B:
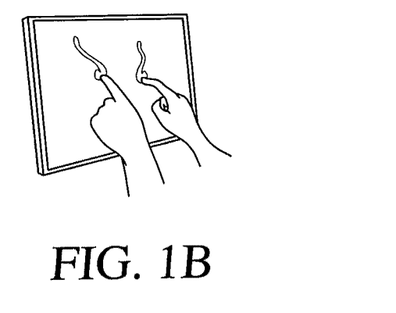
Figure 1C:
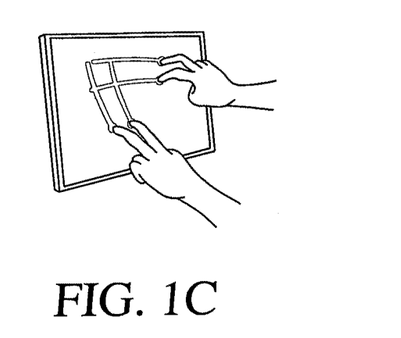
Figure 1D:
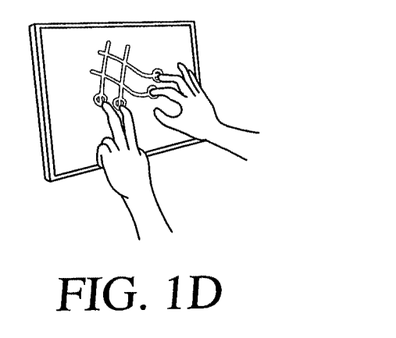
Figure 2:
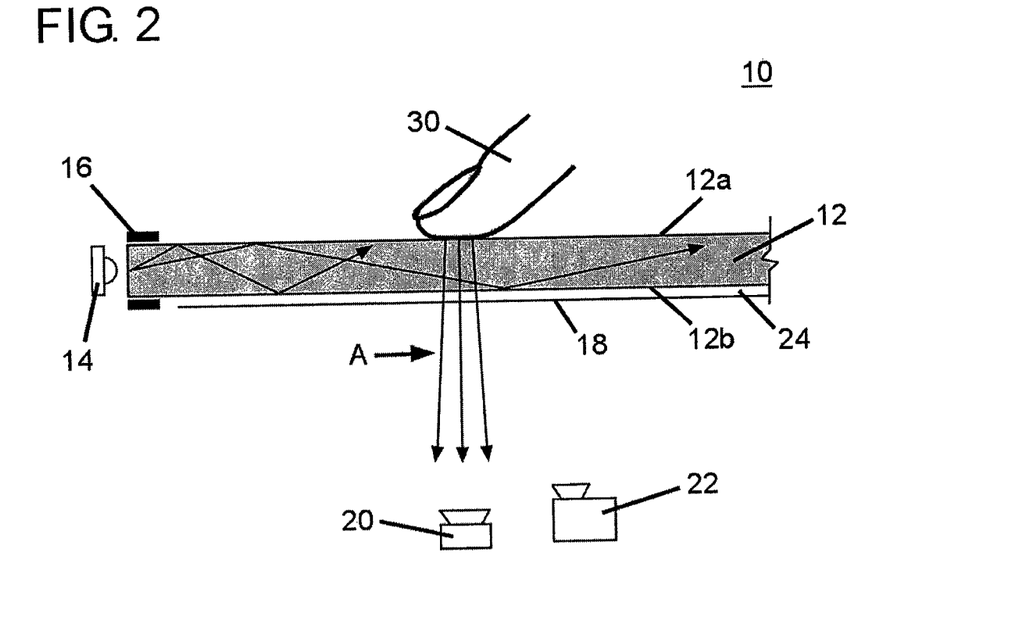
FIG. 2 is a schematic illustration of a multi-touch sensing display based on frustrated total internal reflection in accordance with the present invention.

FIG. 2 of the drawings is a simplified schematic illustration of a multi-touch sensing display 10 in accordance with the present invention. As shown, multi-touch sensing display 10 also called, for convenience, "sensor 10") includes an optical waveguide 12, a light source 14, light absorbing surfaces (or "baffle") 16, and an imaging sensor 20 (also called imaging camera herein)(other elements in FIG. 2 described below).

Light source 14 preferably includes multiple high-power infrared LEDs, which are placed directly against a polished edge of optical waveguide 12 so as to maximize coupling into total internal reflection. For example, the LEDs can provide a total optical output of 460 mW at 880 nm, although other optical outputs can be employed.

Optical waveguide 12 may be a sheet of acrylic whose edges have been polished to admit light, but other suitable materials may be utilized. In one example of a manufactured prototype, a one-quarter inch (6.4 mm) thick acrylic sheet having the dimensions of 16 inches by 12 inches (406 mm×305 mm) is utilized as the optical waveguide. Common glass generally is not preferred due to its poor optical transmittance. However, clearer glass formulations (e.g. "water white") may be employed. Though more expensive, such glass is structurally stiffer and is far less easily scratched than acrylic.

The light emitted from light source 14 undergoes total internal reflection within optical waveguide 12, thus causing the light to remain trapped within optical waveguide 12. When an object is placed in contact with a contact surface 12a of the optical waveguide, such as a finger 30 shown in FIG. 2, total internal reflection is frustrated thus causing some light to scatter from the optical waveguide ("scattered light"), as represented by arrows "A" in the figure.

Figure 3:
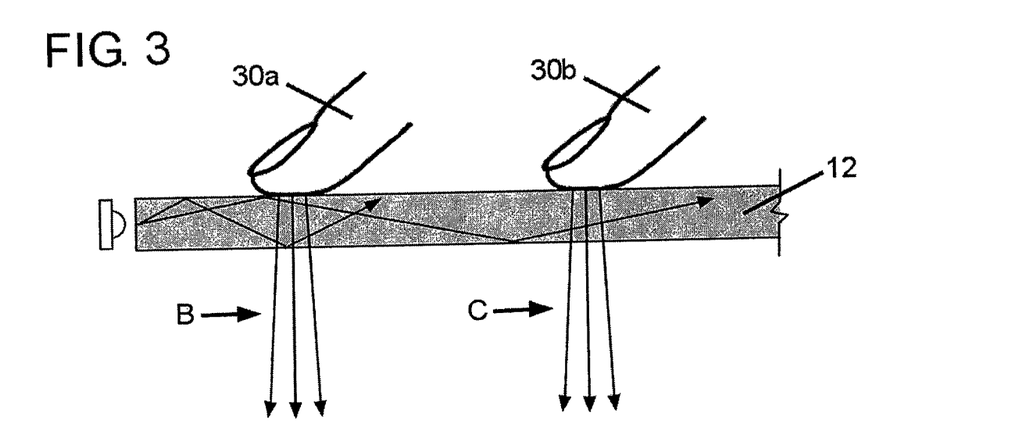
FIG. 3 is a schematic illustration of utilizing two fingers with the multi-touch sensing display of the present invention.

While sensor 10 of the present invention may be employed for single contact (or touch) applications, it is particularly well suited in accordance with the present invention for multi-touch applications. FIG. 3 schematically illustrates when two fingers of a user simultaneously contact the optical waveguide of the multi-touch sensing display of the present invention. As shown, first and second fingers 30a, 30b contact the optical waveguide 12 at two different locations, thus resulting in the frustration of the total internal reflection within the optical waveguide in two regions. Thus, light escapes from such different regions of the optical waveguide, as represented by arrows "B" and "C" in the figure.

Referring back to FIG. 2, the imaging sensor is mounted orthogonally to detect the light scattered through the optical waveguide. In another arrangement, various optical components (e.g., mirrors) may be employed to redirect the scattered light to allow the imaging sensor to be disposed at another location. In either case, the imaging sensor preferably is equipped with a band-pass filter matched to the output of the light source (e.g., 14) to minimize background signal. The imaging sensor may be of different types, e.g., CCD, CMOS.

The function of the imaging sensor can also be provided by any other means for sensing multiple points of light, such as a 2D array of photodiodes or phototransistors or other light-sensing elements.

In accordance with the present invention, imaging sensor 20 continuously images the light escaping from non-contact surface 12b of optical waveguide 12. Accordingly, imaging sensor 20 discriminately senses, for each successive instant of time, all points of contact of optical waveguide 12. Hence, for a "single" point of contact, such as contact by one finger of a user as shown in FIG. 2, a single "area" of contact corresponding to the surface of the finger actually contacting the optical waveguide is discriminately sensed by the imaging sensor. Likewise, when two or more objects (e.g., two or more fingers of a user) contact the optical waveguide, multiple areas of contact are discriminately (and simultaneously) sensed by the imaging sensor. As used herein, a point of contact, contacting a "location" or other similar phase is understood to mean an area of contact, unless it is clear within the context of the description that another meaning is intended.

In addition, even for a single point of contact (i.e., area of contact), the sensor of the present invention discriminates between a relatively small point of contact and a larger point of contact. For example, a finger contacting the optical waveguide with a relatively small amount of pressure provides an area of contact that generally is smaller than the area of contact when greater pressure is applied (i.e., more of the finger contacts the surface of the optical waveguide when greater pressure is applied).

By employing an imaging sensor with a sufficiently high frame capture rate (e.g., 60 frames per second) and a sufficiently high imaging resolution, one, two or more points (areas) of contact of the optical waveguide are continuously sensed to sufficiently track all initial contact, movement and discontinuation of contact by one or more objects (including simultaneous and/or sequential contact/movement), such as by the fingers of a user of the multi-touch sensing display of the present invention.

The output of imaging sensor 20 preferably is supplied to a suitable computer (not shown) or other electronic device capable of handling various well-known image-processing operations, such as rectification, background subtraction, noise removal, and analysis for each video frame. Well-known machine vision tracking techniques then may be employed to translate the video sequences into discrete touch events and strokes. An imaging sensor that captures the light at 8-bit monochrome at 60 frames per second at a resolution of 640×480 (corresponding to 1 $mm^2$ precision on the surface) is suitable for many multi-touch sense applications. Of course, an imaging sensor having greater resolution, a different frame capture rate and/or other characteristics may be employed. Processing may be carried out by any suitable computing system.

Multi-touch sensing in accordance with the present invention provides full imaging touch information without occlusion or ambiguity issues. The touch sense is zero-force and true, that is, it accurately discriminates touch from a very slight hover. The multi-touch sensing display of the present invention is capable of sampling at both high temporal and spatial resolutions. The multi-touch sensing display is scalable to relatively large surfaces, such as a wall-sized touch display, although various factors including sensor/camera resolution and amount of illumination should be taken into account for the multi-touch sensing display to cover relatively large areas.

Figure 4:
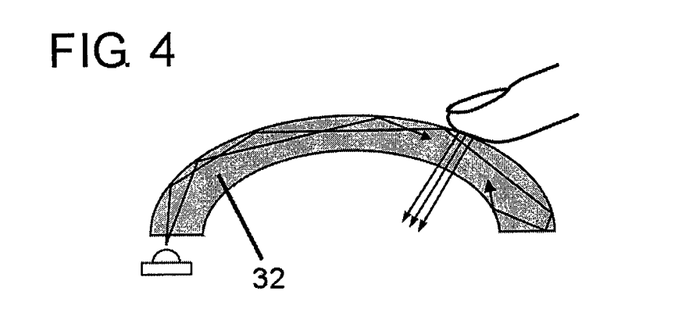
FIG. 4 is a schematic illustration of a non-planar optical waveguide that may be utilized in accordance with the present invention.

In one particular variation of the present invention, the optical waveguide has a non-flat contact surface, i.e., non-planar. The contact surface may be concave, convex or other non-flat design. As one example, FIG. 4 shows an optical waveguide 32 having a hemispherical shape suitable, for example, for terrestrial body mapping control applications.

The multi-touch sensing display of the present invention can be used standalone, but because it is completely visually transparent, it is particularly well suited for use in combination with rear-projection. For example, such a combination avoids the disadvantages of occlusion and shadowing associated with top/front projection. In accordance with another embodiment of the present invention, a video projector 22 as shown in FIG. 2 may be employed within the multi-touch sensing display of the present invention. Although FIG. 2 shows projector 22 arranged alongside imaging sensor 20, projector 22 may be disposed at other locations and/or away from imaging sensor 20, generally with the aid of suitable optics.

Along with projector 22, a suitable diffuser 18 is disposed on the rear (non-contact) side of optical waveguide 12. Diffuser 18 is disposed alongside optical waveguide 12 with a small gap 24 between the two so that diffuser 18 does not frustrate the total internal reflection of the light output by light source 14. Moreover, diffuser 18 does not appreciably affect the IR image seen by imaging sensor 20 since diffuser 18 is relatively close to the sources of light (e.g. the user's fingers) being imaged. While this scheme introduces a disparity between the display and interaction surfaces, corresponding to the thickness of the waveguide (one-quarter inch in the example), an optical waveguide having a smaller thickness may be employed if necessary. In such case, rigidity of a relatively large optical waveguide can be increased by employing another layer of transparent material stacked to the rear of the diffuser to add structural support without increasing disparity.

Preferably, optical waveguide 12 includes an anti-reflective coating on the non-contact side (projector side) to minimize reduction in the brightness of the display output by projector 22.

The response of the multi-touch sensing display of the present invention may be dependant on the optical qualities of the object being sensed. For example, an article, such as a coffee mug, lying on the contact side of the optical waveguide may not be detected if such contact does not frustrate the total internal reflection of the light. The present invention, however, may be designed (further discussed below) so that FTIR is not dependent on the type of material contacting the contact side of the optical waveguide. In such case, the multi-touch sensing display of the present invention sufficiently detects contact by, for example, gloved hands (or dry skin), passive styluses and arbitrary objects.

Figure 5:
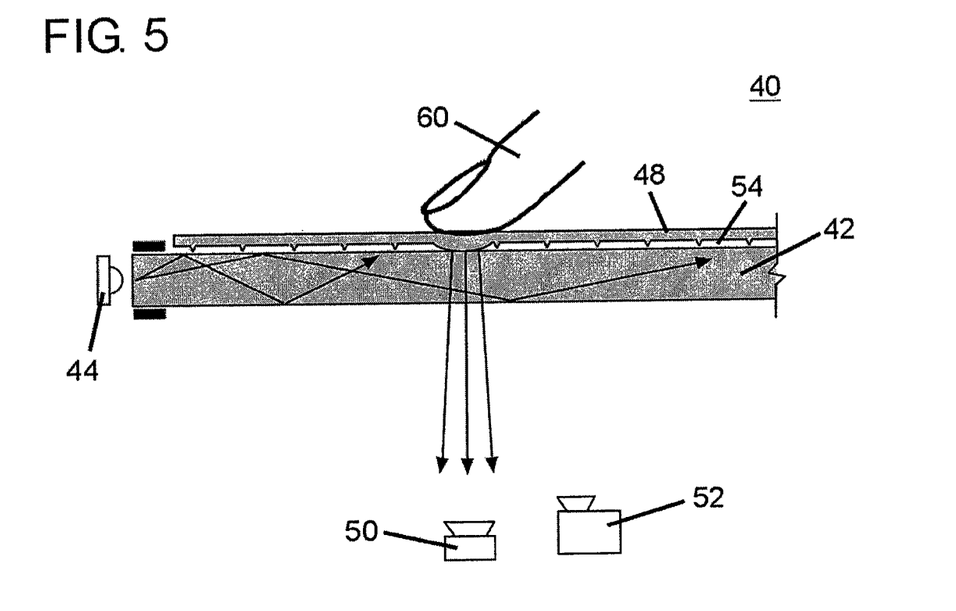
FIG. 5 is a schematic illustration of a multi-touch sensing display employing a compliant surface overlay in accordance with the present invention.

In accordance with another embodiment of the present invention, a compliant surface overlay may be employed with the multi-touch sensing display of the present invention. FIG. 5 of the drawings is a simplified schematic illustration of a multi-touch sensing display 40 employing a compliant surface overlay 48 (or "compliant surface"). As shown, compliant surface 48 is disposed adjacent the contact surface of optical waveguide 42. A small gap 54 is disposed between compliant surface 48 and optical waveguide 42 so that total internal reflection of the light output by light source 44 is not frustrated (or is negligibly frustrated) when there is no contact with the compliant surface by, for example, a user's finger 60. On the other hand, when compliant surface 48 is depressed at one location or simultaneously depressed at multiple locations by, for example, one or more fingers of a user, the compliant surface contacts the optical waveguide immediately below (i.e., adjacent) such contacted locations thus frustrating total internal reflection at such points of contact which, in turn, causes (simultaneously) light to escape from the optical waveguide at locations that correspond to where the compliant surface was contacted. Imaging sensor 50 thereafter detects the escaped light.

The compliant surface may be made of various plastic films and other materials, including common vinyl rear-projection screen material (e.g., Rosco Gray #02015). Various other compliant surfaces in accordance with the present invention are discussed further below.

Figure 6A:
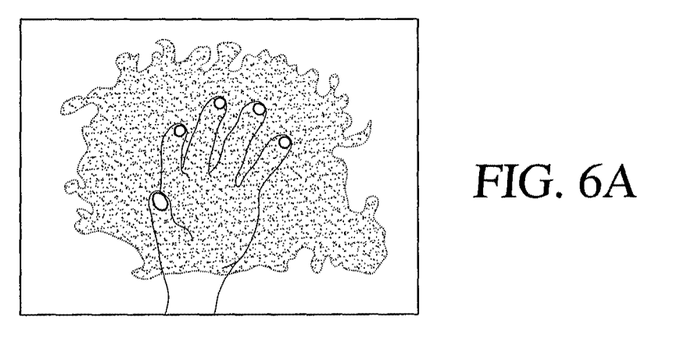
FIGS. 6A and 6B respectively show images from outputs of a contaminated surface and when employing a compliant surface in accordance with the present invention.
Figure 6B:
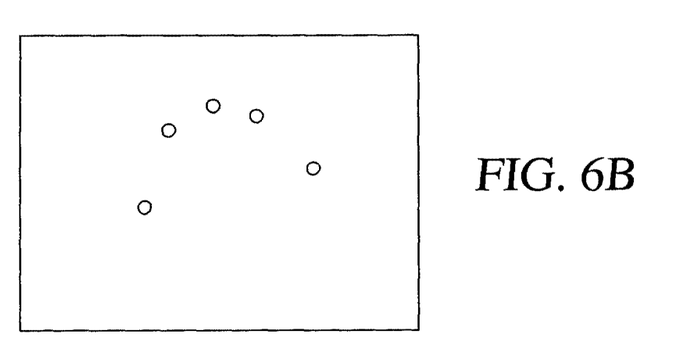

The multi-touch sensing display employing a compliant surface in accordance with the present invention advantageously is immune to contaminants, such as oil and perspiration, which may be deposited on the sensor over extended usage. That is, the existence of oils, dirt, perspiration and other materials on the contact surface of the compliant surface does not degrade or otherwise impact frustrated total internal reflection upon depression of the compliant surface. Likewise, scratches and nicks on the contact surface of the compliant surface do not impact the sensing capability of the multi-touch sensing display of the present invention. For example, FIG. 6A shows an image of an output of a contaminated surface in the absence of a compliant surface, whereas FIG. 6B shows an image of an output when employing a compliant surface. As shown, noise resulting from the contaminants is completely removed in the case of when a compliant surface is employed in the multi-touch system of the present invention.

The multi-touch sensing display employing a compliant surface in accordance with the present invention advantageously also now functions based on true force information rather than the effectiveness of the touching object with respect to FTIR. This allows the sensor to indiscriminately detect any object depressing the surface. Thus, a user may utilize passive styluses, or use gloved hands, pens, etc.

In an alternative embodiment, as further discussed below, multiple infrared wavelengths are employed to better discriminate the desired signal from background sources and noise.

The multi-touch sensing display employing a compliant surface in accordance with the present invention, as discussed above, may be utilized without a rear projector. In accordance with another embodiment of the present invention, the multi-touch sensing display employing a compliant surface also employs a rear projector (e.g., projector 52 shown in FIG. 5). Preferably, and advantageously, the compliant surface operates also as a diffuser for the rear-projection. Hence, any disparities that result from the use of multiple surfaces in a combined multi-touch sensor and display system are eliminated by the present invention. Thus, this embodiment of the present invention is a fundamentally unified system for graphical display and for sensing.

In accordance with another embodiment of the present invention, the compliant surface is comprised of a composite of multiple materials, each generally contributing to one or more of the following desired characteristics: i) FTIR effectiveness; ii) function as an optical diffuser for rear-projection; iii) wavelength selective shielding to mitigate interference from external ambient light; iv) anti-glare to enhance visibility of the display; v) the tactile "feel" for a human; and vi) durability—a "hardcoat" wear layer preferably replaceable in the field. The various layers employed may be affixed to one another using well-known index-of-refraction matched optical adhesives.

As one example of a compliant surface comprised of a composite of multiple materials, a stack includes (1) a thin layer of rubber, (2) a thin-film PET (polyethylene terephthalate) film with a metal coating, and (3) a thin PET film chemically treated to have a matte surface. The thin layer of rubber provides for FTIR contact, operates as the diffuser for rear-projection, and also provides a comfortable tactile response. The thin-film PET (polyethylene terephthalate) film with the metal coating reflects/absorbs ambient infrared light. The thin PET film treated to have a matte surface provides for a comfortable surface on which a user's finger or fingers can easily glide across, and for durability.

Figure 7:
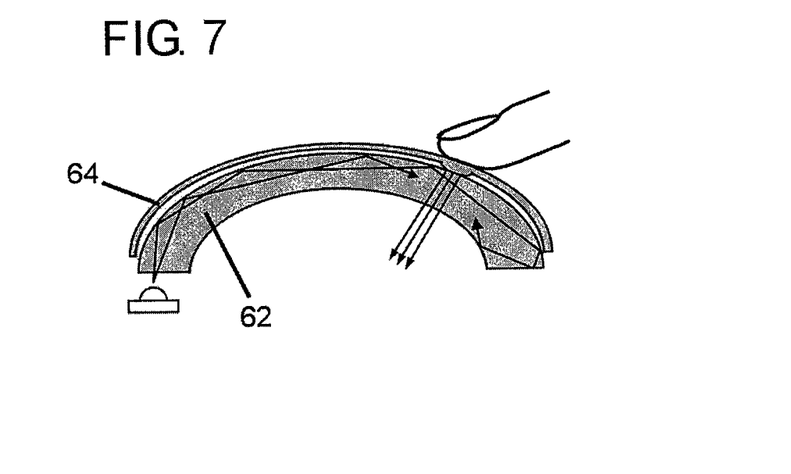
FIG. 7 is a schematic illustration of a non-planar optical waveguide and a non-planar compliant surface overlay that may be utilized in accordance with the present invention.

The compliant surface may be non-flat, i.e., non-planar. It may concave, convex or have another non-flat design. Similar to the non-flat optical waveguide shown in FIG. 4, FIG. 7 shows an exemplary non-flat optical waveguide 62 on which a non-flat compliant surface overlay 64 is disposed. As another variation, a non-flat compliant surface overlay may be disposed over a flat optical waveguide.

In accordance with a further embodiment of the present invention, any of the herein-described embodiments and variations may employ a light source (e.g., LED 14 shown in FIG. 2 or LED 44 shown in FIG. 5) that is pulsed and synchronized to the shutter of the imaging sensor (e.g., video sensor 20 shown in FIG. 2 or video sensor 50 shown in FIG. 5), to beneficially reduce the amount of ambient light received by the imaging sensor. That is, the imaging sensor's shutter is only exposed to the pulse period of the light source. As a feature of the present invention, the light source can be pulsed at a brighter intensity to increase the signal to noise ratio of the system. Other types of light sources (e.g. lasers) may be used as well.

Figure 8:
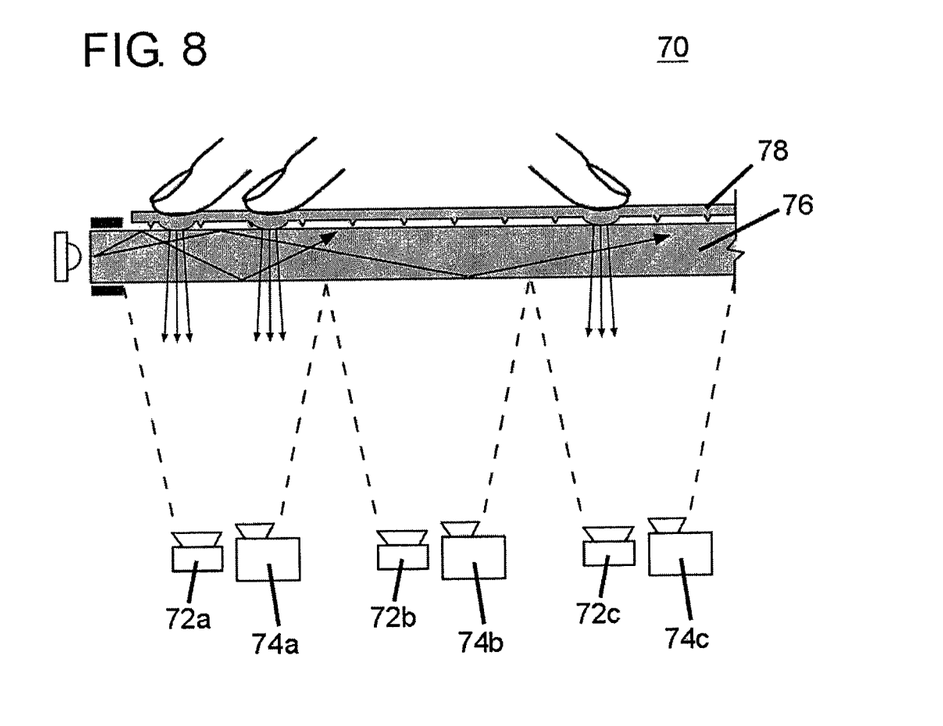
FIG. 8 is a schematic illustration of a system employing multiple imaging sensors and projectors in accordance with the present invention.

In another embodiment of the present invention, multiple imaging sensors and multiple projectors are employed, generally to allow for the implementation of a relatively large multi-touch system (e.g., for use by multiple users simultaneously). FIG. 8 shows a schematic illustration of an exemplary system 70 employing three imaging sensors 72a, 72b and 72c, along with three projectors 74a, 74b and 74c. In one version, as shown in FIG. 8, each sensor images light escaping a different portion of optical waveguide 76 and each projector projects a respective video image onto one of those portions. The imaging sensors and projectors may be spaced apart from one another along a single axis, multiple axes, along a grid system, or other suitable manner. In the exemplary arrangement shown in FIG. 8, a compliant surface 78 is employed, but multiple sensors and/or multiple projectors may be employed in a system without a compliant surface overlay, or in any other embodiment described herein.

Figure 9:
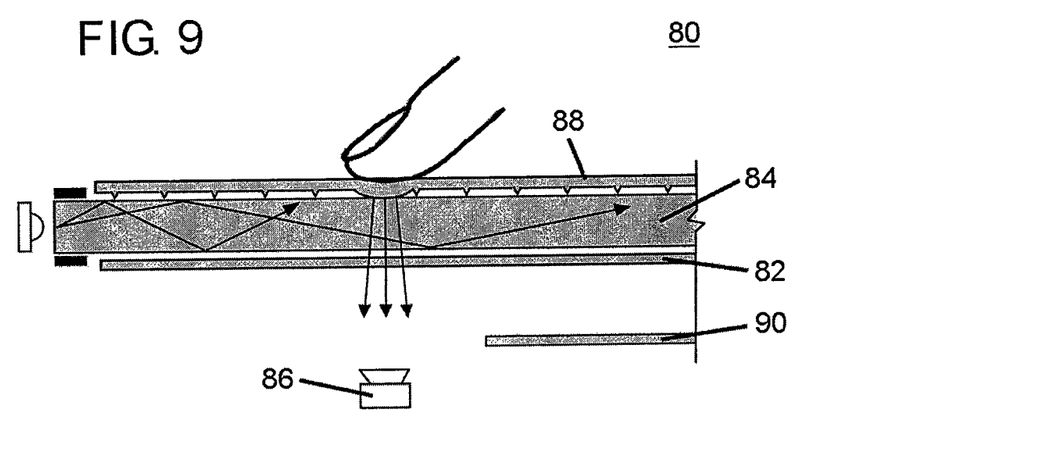
FIG. 9 is a schematic illustration of a multi-touch sensing display employing an LCD in accordance with the present invention.

In a further embodiment of the present invention, an LCD display panel is used in place of a projector. FIG. 9 shows a simplified schematic illustration of a system 80 with a multi-touch sensor employing an LCD panel 82 disposed between an optical waveguide 84 and an imaging sensor 86. LCD panel 82 is adapted/designed to be transparent to infrared light so that infrared light that escapes optical waveguide 84 is imaged by imaging sensor 86. Since LCD panels are well known, further description thereof is omitted herein except where otherwise necessary for an understanding of the present invention. An LCD backlight 90 may be disposed behind LCD panel 82. A compliant surface 88 also may be utilized and, in such case, the compliant surface preferably is adapted/designed to not have optical diffuser properties. Generally, use of an LCD display panel advantageously reduces volume and increases portability.

In yet a further embodiment of the present invention, one or more additional image sensors are also placed behind the LCD panel. The images from these sensors are processed by computing machines to determine extra information about the touch points and/or the user—e.g. the pose or identification of the user's finger associated with each touch.

Figure 10:
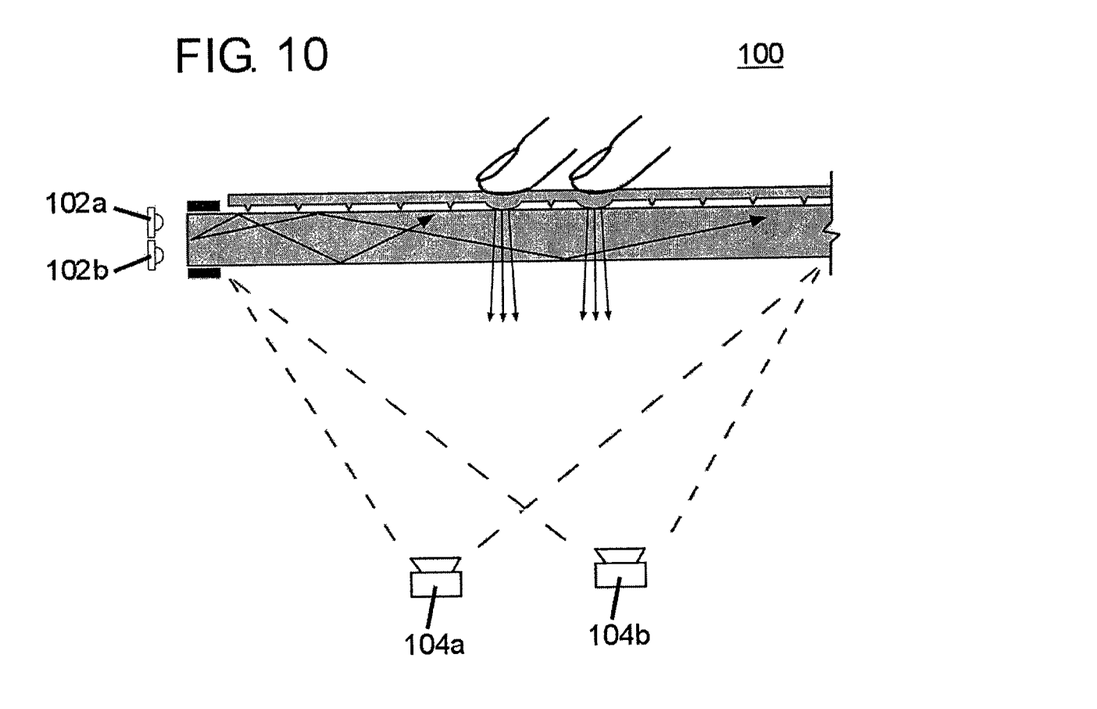
FIG. 10 is a schematic illustration of a multi-touch sensing display employing multiple wavelengths of light and multiple imaging sensors in accordance with the present invention.

In yet a further embodiment of the present invention, two wavelengths of light, preferably infrared light, are output from the light source and two imaging sensors are employed, such as schematically illustrated in FIG. 10. In the illustrative embodiment, two sets of LEDs 102a and 102b are employed in system 100. LED 102a, which may be an array of LEDs or another type of light source, emits light at, for example, 880 nm. Similarly, LED 102b, which also may be an array of LEDs or another type of light source, emits lights at, for example, 950 nm. Imaging sensors 104a images light at the first wavelength (e.g., 880 nm) and imaging sensor 104b images light at the second wavelength (e.g., 940 nm). Suitable filters may be employed. As an optional feature of the present invention, light must be received by both imaging sensors (e.g., at the same time and location) for the system to acknowledge the occurrence of a contact (i.e., FTIR response) at such time/location. Well-known processing methods may be employed to process both video streams in this manner. Thus, by employing multiple wavelengths and multiple imaging sensors, FTIR response is further discriminated from background light. Moreover, a live finger is discriminated from latent residues in the event a compliant surface is not utilized. Three or more wavelengths may be employed. In a variation, a single imaging sensor is employed and designed to image light at multiple selective frequencies or frequency ranges. Multiple wavelengths of light, along with one or more imaging sensors, may be employed in the various systems described herein, including systems that employ a compliant surface overlay as well as those that do not.

In yet another embodiment of the present invention, an electro-switchable diffuser screen is employed with a projector. An LC (liquid crystal) privacy glass window capable of being electrically switchable from a transparent state to a frosty appearance under electronic control is employed. Such an electro-switchable screen, is disclosed in Kunz, A. M. and Spagno, C. P., "Technical System for Collaborative Work. In Proceedings of the Workshop on Virtual Environments" (Barcelona, Spain, May 30-31, 2002); and in W. Stürzlinger and S. Müller, Eds. ACM International Conference Proceeding Series, vol. 23. Eurographics Association, Aire-la-Ville, Switzerland, 73-80, each of which is incorporated herein by reference.

The LC privacy glass window is switched between the two states at a relatively rapid rate (e.g., 60 times a second) and is synchronized to switch with the imaging sensor (e.g., infrared camera) so that a second (or third) sensor view see through the screen, such as to observe the touching object, when the LC privacy glass window is momentarily transparent. If a compliant surface is employed, it is chosen/engineered to not be diffusive. The images from the additional sensors are processed by computing hardware to determine other information about the touches—e.g. the orientation or pose of the user's hand. In a variation, the diffuser can be a directional-type diffuser that is designed to diffuse for selected angles of incidence, and to not diffuse for other angles of incidence.

In yet a further embodiment of the present invention, various other diffusers may be employed to allow additional sensors to view through the screen clearly while simultaneously diffusing light from rear-projection. An exemplary screen includes the holographic film employed by TouchLight, discussed in Wilson, A. D., "TouchLight: An Imaging Touch Screen and Display for Gesture-Based Interaction," Proceedings of the 6th International Conference on Multimodal Interfaces (State College, Pa., USA, Oct. 13-15, 2004), ICMI '04, ACM Press, New York, N.Y., 69-76 (2004), incorporated herein by reference. A less expensive, directionally scattering film is discussed in Matsushita, M., Iida, M., Ohguro, T., Shirai, Y., Kakehi, Y., and Naemura, T., "Lumisight Table: A Face-to-face Collaboration Support System That Optimizes Direction of Projected Information to Each Stakeholder," Proceedings of the 2004 ACM Conference on Computer Supported Cooperative Work (Chicago, Ill., USA, Nov. 6-10, 2004), CSCW '04, ACM Press, New York, N.Y., 274-283 (2004), which is incorporated herein by reference. A Rayleigh-scattering material may be employed that that diffuses visible wavelengths, but is substantially transparent to a convenient infrared band.

The present invention has been described in the context of a number of embodiments, and for various ones of those embodiments, a number of variations and examples thereof. It is to be understood, however, that other expedients known to those skilled in the art or disclosed herein may be employed without departing from the spirit of the invention.

What is claimed is:

1. A multi-touch sensing display, comprising:
    a light source;
    a display element having a viewer side and a rear side;
    an optical waveguide, the optical waveguide having a contact surface, a non-contact surface, and one or more edge surfaces, the non-contact surface facing and covering at least a portion of the viewer side of the display element, at least one of the one or more edge surfaces of the optical waveguide being adapted to receive light emitted by the light source, the optical waveguide being adapted to cause some of the received light to undergo total internal reflection within the optical waveguide;
    a compliant surface overlay having a touch surface and a display-side surface, the display-side surface facing the contact surface of the optical waveguide and being spaced apart from the contact surface by a gap, the optical waveguide, the compliant surface overlay and the gap therebetween being configured to promote total internal reflection of light in the optical waveguide, the compliant surface overlay being disposed sufficiently close to the optical waveguide to enable depression of the compliant surface overlay by an external force against the touch surface of the compliant surface overlay to cause the display-side surface of the compliant surface overlay to contact the contact surface of the optical waveguide, the optical waveguide and the compliant surface overlay being adapted to cause the total internal reflection within the optical waveguide to be frustrated upon contact of the contact surface of the optical waveguide by the display-side surface of the compliant surface overlay, the optical waveguide adapted to allow some of the light undergoing total internal reflection to escape through its non-contact surface when the total internal reflection is frustrated; and at least an imaging sensor positioned opposing the non-contact surface of the optical waveguide and adapted to detect light escaping the optical waveguide toward the display element, wherein the compliant surface overlay includes a component that rejects ambient light of the same wavelengths as the light source, a component that reduces friction at an interaction surface, and a component that reduces glare.

2. The multi-touch sensing display of claim 1, wherein the gap comprises a small gap disposed between a substantial portion of the compliant surface overlay and the optical waveguide so that the frustration of the total internal reflection is minimized during non-depression of the compliant surface overlay.

3. The multi-touch sensing display of claim 1, wherein the compliant surface overlay is adapted to be depressed by at least one finger of a user of the multi-touch sensing display, a stylus and another object applying force.

4. The multi-touch sensing display of claim 1, wherein the compliant surface overlay is adapted to contact the optical waveguide at a plurality of locations simultaneously in response to simultaneous depression of the compliant surface overlay at a plurality of corresponding locations, the optical waveguide adapted to cause the total internal reflection to be frustrated simultaneously within the optical waveguide at said plurality of locations.

5. The multi-touch sensing display of claim 4, wherein at least two of the plurality of corresponding locations at which the compliant surface overlay are simultaneously depressed are disposed apart from one another.

6. The multi-touch sensing display of claim 1, wherein the imaging sensor is adapted to discriminately detect light output from positions along a two-dimensional surface of the optical waveguide.

7. The multi-touch sensing display of claim 1, wherein the imaging sensor is adapted to discriminately detect light simultaneously escaping from a plurality of positions along a two-dimensional surface of the optical waveguide.

8. The multi-touch sensing display of claim 1, wherein the light source is adapted to emit light of a predetermined wavelength, and the imaging sensor is adapted to detect light only substantially at the predetermined wavelength.

9. The multi-touch sensing display of claim 1, wherein the light source is adapted to emit light of first and second predetermined wavelengths, and the imaging sensor is adapted to detect light only substantially at the first predetermined wavelength; the multi-touch sensing display further comprising a second imaging sensor adapted to detect light only substantially at the second predetermined wavelength escaping the optical waveguide.

10. The multi-touch sensing display of claim 1, wherein the light source is adapted to emit pulses of light at a rate substantially synchronized to a shutter of the imaging sensor.

11. The multi-touch sensing display of claim 1, wherein the compliant surface overlay includes a non-planar contact surface, the compliant surface overlay being adapted to contact the optical waveguide upon depression by the external force of the non-planar contact surface.

12. The multi-touch sensing display of claim 1, further comprising a video projector adapted to project a two-dimensional video image.

13. The multi-touch sensing display of claim 12, wherein the display element comprises a diffuser onto which the video image is projected.

14. The multi-touch sensing display of claim 13, wherein the diffuser is an electro-switchable diffuser screen synchronized to a rate of projection of the video projector, the diffuser being adapted to be non-diffusive in accordance with shutter periods of the imaging sensor.

15. The multi-touch sensing display of claim 14, further comprising at least one additional imaging sensor adapted to image through the diffuser so as to image an object applying the external force to cause the compliant surface overlay to contact the optical waveguide.

16. The multi-touch sensing display of claim 13, wherein the diffuser is a directional diffuser adapted to diffuse for predetermined angles of incidence, and adapted to not diffuse for other angles of incidence.

17. The multi-touch sensing display of claim 1, wherein the compliant surface overlay includes a component that provides a comfortable cushion for a user to depress.

18. The multi-touch sensing display of claim 1, further comprising a video projector adapted to project a two-dimensional video image through the optical waveguide.

19. The multi-touch sensing display of claim 1, wherein the display element comprises an LCD display panel disposed between the imaging sensor and the optical waveguide for displaying a video image, the LCD display panel being transparent to light escaping the optical waveguide so as to not prevent the escaping light from being detected by the imaging sensor, and the compliant surface overlay being adapted not to diffuse.

20. A method of multi-touch sensing, comprising the steps of:

displaying one or more images using a display element having a viewer side and a rear side;

receiving, within an optical waveguide through at least one edge surface of the optical waveguide, light emitted by a light source, the optical waveguide having a contact surface, a non-contact surface, and one or more edge surfaces, the non-contact surface facing and covering at least a portion of the viewer side of the display element;

internally reflecting the received light within the optical waveguide;

depressing a compliant surface overlay disposed adjacent to the optical waveguide based on an external force against a touch surface of the compliant surface overlay, the compliant surface overlay having the touch surface and a display-side surface, the display-side surface facing the contact surface of the optical waveguide and being spaced apart from the contact surface by a gap, the optical waveguide, the compliant surface overlay and the gap therebetween being configured to promote total internal reflection of light in the optical waveguide, wherein the compliant surface overlay includes a component that rejects ambient light of the same wavelengths as the light source, a component that reduces friction at an interaction surface, and a component that reduces glare;

contacting the contact surface of the optical waveguide by the display-side surface of the compliant surface overlay upon depressing the compliant surface overlay;

frustrating the internally reflected light within the optical waveguide upon contacting the contact surface of the optical waveguide by the display-side surface of the compliant surface overlay to cause some of the internally reflected light to escape the optical waveguide; and imaging, using at least an imaging sensor positioned opposing the non-contact surface of the optical waveguide, light escaping the optical waveguide toward the display element.

21. The method of claim 20, wherein the gap comprises a small gap between a substantial portion of the compliant surface overlay and the optical waveguide so that frustrating the internally reflected light is minimized when the compliant surface overlay is not depressed.

22. The method of claim 20, wherein depressing the compliant surface overlay comprises depressing the compliant surface overlay by a finger of a user.

23. The method of claim 20, wherein depressing the compliant surface overlay comprises depressing simultaneously the compliant surface overlay at a plurality of locations, contacting the optical waveguide comprises contacting simultaneously the optical waveguide by the compliant surface overlay at a plurality of corresponding locations, and frustrating the internally reflected light comprises frustrating simultaneously the internally reflected light within the optical waveguide at said plurality of corresponding locations.

24. The method of claim 23, wherein at least two of said plurality of corresponding locations are disposed apart from one another.

25. The method of claim 20, wherein imaging the escaped light comprises imaging discriminately light output from positions along a two-dimensional surface of the optical waveguide.

26. The method of claim 20, wherein imaging the escaped light comprises imaging discriminately light simultaneously escaping from a plurality of positions along a two-dimensional surface of the optical waveguide.

27. The method of claim 20, wherein receiving light within the optical waveguide comprises receiving light of a predetermined wavelength, and imaging the escaped light comprises imaging light only substantially at the predetermined wavelength.

28. The method of claim 20, wherein receiving light within the optical waveguide comprises receiving light of first and second predetermined wavelengths, and imaging the escaped light comprises imaging light only substantially at the first and second predetermined wavelengths.

29. The method of claim 28, wherein imaging the escaped light comprises imaging light only substantially at the first predetermined wavelength by a first imaging sensor and imaging light only substantially at the second predetermined wavelength by a second imaging sensor.

30. The method of claim 20, wherein receiving light comprises receiving pulses of light within the optical waveguide; and imaging the escaped light comprises imaging the escaped light by the imaging sensor, which includes a shutter substantially synchronized to the rate of the pulses of light received within the optical waveguide.

31. The method of claim 20, comprising providing the compliant surface overlay with a non-planar contact surface, and depressing the compliant surface overlay comprises depressing the non-planar contact surface of the compliant surface overlay.

32. The method of claim 20, comprising projecting a two-dimensional video image.

33. The method of claim 32, comprising diffusing the projected video image by the display element.

34. The method of claim 32, comprising diffusing the projected video image by an electro-switchable diffuser screen synchronized to a rate of projection of the video image; wherein imaging the escaped light is carried out by the imaging sensor, the diffuser being non-diffusive in accordance with shutter periods of the imaging sensor.

35. The method of claim 34, comprising imaging through the diffuser by a second imaging sensor an object causing the frustration of the internally reflected light.

36. The method of claim 32, comprising diffusing the projected video image by a directional diffuser adapted to diffuse for predetermined angles of incidence, and adapted to not diffuse for other angles of incidence.

37. The method of claim 20, wherein the compliant surface overlay includes a component that provides a comfortable cushion for a user to depress.

38. The method of claim 20, comprising projecting a two-dimensional video image through the optical waveguide.

39. A multi-touch sensing display, comprising:

a light source;

an optical waveguide configured to receive light emitted by the light source and to cause at least some of the received light to undergo total internal reflection within the optical waveguide, the optical waveguide having a contact surface, a non-contact surface, and one or more edge surfaces, at least one of the one or more edge surfaces of the optical waveguide being configured to receive light emitted by the light source;

a compliant surface overlay having a touch surface and a display-side surface, the display-side surface facing the contact surface of the optical waveguide so as to enable the display-side surface of the compliant surface overlay to contact the contact surface of the optical waveguide when the compliant surface overlay is physically depressed, the compliant surface overlay being spaced apart from the contact surface of the optical waveguide by a gap and being configured to:

cause frustration of the total internal reflection of the received light within the optical waveguide at a contact point between the display-side surface of the compliant surface overlay and the contact surface of the optical waveguide when the display-side surface of the compliant surface overlay is physically depressed to contact the contact surface of the optical waveguide such that some of the received light undergoing total internal reflection within the optical waveguide escapes from the optical waveguide at the contact point; and operate as a diffuser for rear projection;

a projector positioned opposing the non-contact surface of the optical waveguide and configured to project images that are diffused by the compliant surface overlay and made visible to a user providing touch inputs to the touch surface of the compliant surface overlay, the non-contact surface of the optical waveguide facing the projector; and an imaging sensor positioned opposing the non-contact surface of the optical waveguide and configured to detect light escaping the optical waveguide toward the projector to enable detection of touch input provided to the compliant surface overlay and discrimination between a relatively small point of contact with the compliant surface overlay and a relatively large point of contact with the compliant surface overlay, the imaging sensor being configured to detect pressure applied to the compliant surface overlay based on whether the touch input causes the relatively small point of contact with the compliant surface overlay or the relatively large point of contact with the compliant surface overlay, wherein the compliant surface overlay is a composite of multiple layers affixed to one another using index-of-refraction matching optical adhesives, and wherein the multiple layers of the compliant surface overlay comprise a layer that functions as an optical diffuser for rear projection, a layer that that provides wavelength selective shielding to mitigate interference from external ambient light, and an anti-glare layer to enhance visibility of the display.

40. A multi-touch sensing display, comprising:

an infrared light source;

an optical waveguide configured to receive infrared light emitted by the infrared light source and to cause at least some of the received infrared light to undergo total internal reflection within the optical waveguide, the optical waveguide having a contact surface, a non-contact surface, and one or more edge surfaces, at least one of the one or more edge surfaces of the optical waveguide being configured to receive infrared light emitted by the infrared light source;

a compliant surface overlay having a touch surface and a display-side surface, the display-side surface facing the contact surface of the optical waveguide so as to enable the display-side surface of the compliant surface overlay to contact the contact surface of the optical waveguide when the compliant surface overlay is physically depressed, the compliant surface overlay being spaced apart from the contact surface of the optical waveguide by a gap and being configured to:

cause frustration of the total internal reflection of the received infrared light within the optical waveguide at a contact point between the display-side surface of the compliant surface overlay and the contact surface of the optical waveguide when the display-side surface of the compliant surface overlay is physically depressed to contact the contact surface of the optical waveguide such that some of the received infrared light undergoing total internal reflection within the optical waveguide escapes from the optical waveguide at the contact point;

at least an imaging sensor positioned opposing the non-contact surface of the optical waveguide and configured to detect infrared light escaping the optical waveguide to enable detection of touch inputs being provided to the compliant surface overlay;

a liquid crystal display panel positioned between the optical waveguide and the imaging sensor, the liquid crystal display panel being configured to display images and being transparent to infrared light so that infrared light escaping the optical waveguide passes through the liquid crystal display panel and is imaged by the imaging sensor, where the compliant surface overlay has relatively low optical diffuser properties such that images displayed by the liquid crystal display panel are visible to a user providing touch inputs to the compliant surface overlay and the non-contact surface of the optical waveguide faces and covers at least a portion of the liquid crystal display panel, wherein the compliant surface overlay comprises a layer that provides wavelength selective shielding to mitigate interference from external ambient light and an anti-glare layer to enhance display visibility.

41. The multi-touch sensing display of claim 40, further comprising:

multiple imaging sensors positioned opposing the non-contact surface of the optical waveguide and configured to detect infrared light escaping the optical waveguide; and at least one computing machine configured to process images captured by the multiple imaging sensors to determine a pose of a user's finger touching the touch surface of the compliant surface overlay.

42. The multi-touch sensing display of claim 40, further comprising:

multiple imaging sensors positioned opposing the non-contact surface of the optical waveguide and configured to detect infrared light escaping the optical waveguide; and at least one computing machine configured to process images captured by the multiple imaging sensors to determine an identity of a user's finger associated with each of multiple touch points on the touch surface of the compliant surface overlay.

* * * * *